(12) United States Patent
Terami et al.

(10) Patent No.: US 6,476,560 B2
(45) Date of Patent: Nov. 5, 2002

(54) LIQUID CRYSTAL PROJECTOR

(75) Inventors: Kouji Terami, Higashiosaka; Toshiyuki Okino, Osaka, both of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/839,356

(22) Filed: Apr. 23, 2001

(65) Prior Publication Data
US 2001/0033279 A1 Oct. 25, 2001

(30) Foreign Application Priority Data
Apr. 25, 2000 (JP) ........................................ 2000-124601

(51) Int. Cl.[7] ................................................ H01J 13/32
(52) U.S. Cl. ........................ 315/117; 315/225; 315/362; 348/761; 348/744; 353/84
(58) Field of Search ............................... 315/169.3, 225, 315/362, 360, 117, 136, 176; 348/744, 748, 751, 761, 766, 333.1; 353/85, 57, 122

(56) References Cited

U.S. PATENT DOCUMENTS

| 5,491,525 | A | 2/1996 | Yamasaki et al. ............. 353/98 |
| 5,567,030 | A | 10/1996 | Shin ............................. 353/85 |
| RE36,060 | E | * 1/1999 | Miyashita ..................... 348/748 |
| 6,355,942 | B1 | * 3/2002 | Yamazaki et al. ............. 257/72 |

FOREIGN PATENT DOCUMENTS

| DE | 195 11 810 A1 | 10/1995 |
| JP | 1-116535 | 5/1989 |
| JP | 4-053943 | 2/1992 |
| JP | 6-130492 | 5/1994 |
| JP | 8-069054 | 3/1996 |
| JP | 8-234848 | 9/1996 |
| JP | 10-197952 | 7/1998 |
| JP | 11-133505 | 5/1999 |
| JP | 2000-089361 | 3/2000 |

* cited by examiner

*Primary Examiner*—Haissa Philogene
(74) *Attorney, Agent, or Firm*—Arent Fox Kintner Plotkin & Kahn, PLLC

(57) ABSTRACT

A liquid crystal projector comprises a reset switch for resetting the operation of a microcomputer, and abnormality recovery means for initializing, when the liquid crystal projector is in a power on mode, other circuits and the microcomputer without stopping a projecting lamp and a cooling fan when the reset switch is turned on.

2 Claims, 2 Drawing Sheets

LIQUID CRYSTAL PROJECTOR

BACKGROUND OF THE INVENTION

1. Field of the Invention

The present invention relates to processing used for a liquid crystal projector.

2. Description of the Prior Art

In recent years, in liquid crystal projectors, a projecting lamp for projecting an image written into a liquid crystal cell on a screen has been increased in luminance for improving its brightness performance. Further, there is a tendency to miniaturize the liquid crystal projector.

On the other hand, an electric circuit in the liquid crystal projector is required to cope with high resolution and enhance its function by increasing the performance of a personal computer. A semiconductor device having a high integration degree tends to be used, and its power supply voltage is low.

Used as the projecting lamp for projecting the image written into the liquid crystal cell on the screen are a metal halide projecting lamp and a very high pressure mercury projecting lamp. When the lamp is turned on, noises occur. The noises are not restrained as the luminance of the projecting lamp is increased. On the contrary, the noises are liable to be increased. Further, as the liquid crystal projector is miniaturized, the projecting lamp tends to approach the electric circuit.

As the power supply voltage of the electric circuit using the semiconductor having a high integration degree, 3.3 volts have been in the main current. In this state, the noises at the time when the projecting lamp is turned on may affect the electric circuit, resulting in malfunction. When a microcomputer malfunctions, the malfunction may not, in some cases, be recovered unless the power supply is turned off once or the microcomputer is reset.

In general setting, this state can be recovered by turning the power supply on after turning it off once or pressing a reset switch as in a recent personal computer. In the case of the liquid crystal projector, however, when the operation is performed, the projecting lamp is turned off once. The metal halide projecting lamp and the very high pressure mercury projecting lamp cannot be turned on again immediately after being turned off once. One to two minutes must be waited for until the temperature in the projecting lamp is reduced.

The same is true for a case where the reset switch is provided to reset the microcomputer. The liquid crystal projector enters a standby state where the projecting lamp is turned off. When an attempt to operate the liquid crystal projector again is made, one or two minutes must be waited for.

SUMMARY OF THE INVENTION

An object of the present invention is to provide a liquid crystal projector capable of immediately recovering, when an abnormality occurs in the liquid crystal projector, the abnormality and capable of solving trouble in waiting for one to two minutes until the temperature of a projecting lamp is reduced.

In a liquid crystal projector using a microcomputer as a control unit of the liquid crystal projector and comprising a projecting lamp for projecting an image written into a liquid crystal cell and a cooling fan for the projecting lamp, a first liquid crystal projector according to the present invention is characterized by comprising a reset switch for resetting the operation of the microcomputer; and abnormality recovery means for initializing, when the liquid crystal projector is in a power on mode, other circuits and the microcomputer without stopping the projecting lamp and the cooling fan when the reset switch is turned on.

In a liquid crystal projector using a microcomputer as a control unit of the liquid crystal projector and comprising a projecting lamp for projecting an image written into a liquid crystal cell and a cooling fan for the projecting lamp, a second liquid crystal projector according to the present invention is characterized by comprising a reset switch for resetting the operation of the microcomputer; and an abnormality recovery circuit for initializing, when the liquid crystal projector is in a power on mode, other circuits and the microcomputer without stopping the projecting lamp and the cooling fan when the reset switch is turned on.

According to the present invention, even when an abnormality occurs in the liquid crystal projector, the abnormality can be recovered without tuning the projecting lamp off. Accordingly, the abnormal state can be quickly recovered without requiring a waiting time period for cooling the projecting lamp.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
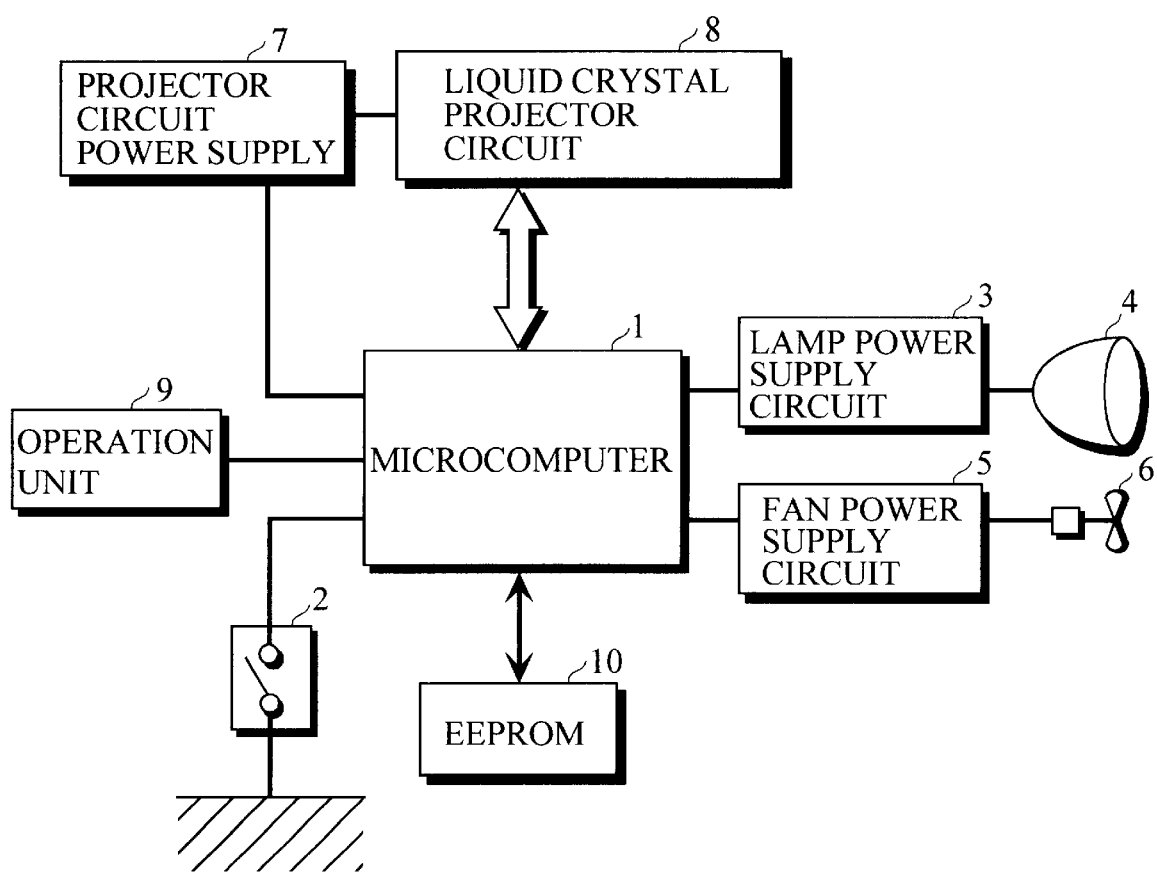
FIG. 1 is a block diagram showing the configuration of a liquid crystal projector.

Referring now to the drawings, an embodiment of the present invention will be described.

FIG. 1 illustrates the configuration of a liquid crystal projector.

A microcomputer 1 mainly controls a liquid crystal projector circuit (a signal processing circuit) 8. Further, the microcomputer 1 is connected to a lamp power supply circuit 3, a fan power supply circuit 5, and a projector circuit power supply 7 in order to carry out on-off control of a projecting lamp 4 for projecting an image written into a liquid crystal cell on a screen and power on/standby mode switching control of the liquid crystal projector circuit 8. Further, the microcomputer 1 comprises an EEPROM (Electrically Erasable and Programmable ROM) 10, which is a nonvolatile memory, in order to store the state of the liquid crystal projector.

A reset switch 2 is connected to an NMI (Non-maskable Interrupt) terminal of the microcomputer 1. A command from a user is entered into the microcomputer 1 by a key (KEW SW) in a control unit and an operation unit 9 composed of a remote control.

In such a configuration, when the power is inputted to the microcomputer 1, the microcomputer 1 sets the liquid crystal projector circuit 8 in a standby mode. That is, all the projecting lamp power supply circuit 3, the fan power supply circuit 5, and the projector circuit power supply 7 are set in an off state.

Thereafter, when a power on operation is. performed by the operation unit 9, the microcomputer 1 sets the liquid crystal projector circuit 8 in a power on mode. That is, all the projecting lamp power supply circuit 3, the fan power supply circuit 5, and the projector circuit power supply 7 are set in an on state. When the power on operation is performed, information indicating that the liquid crystal projector circuit 8 is in the power on mode is stored in the EEPROM 10 as last power mode information.

On the other hand, when a power off operation is performed by the operation unit 9, the microcomputer 1 sets the liquid crystal projector circuit 8 in a standby mode. That is, all the projecting lamp power supply circuit 3, the fan power supply circuit 5, and the projector circuit power supply 7 are set in the off state. When the power off operation is performed, information indicating that the liquid crystal projector circuit 8 is in the standby mode is stored in the EEPROM 10 as last power mode information.

When any abnormal state occurs in a case where the liquid crystal projector circuit 8 is in the power on mode, the user presses the reset switch 2. When the reset switch 2 is pressed, a program for the microcomputer 1 is forced to be jumped to an NMI address, to execute an abnormality recovery processing program at the address.

Figure 2:
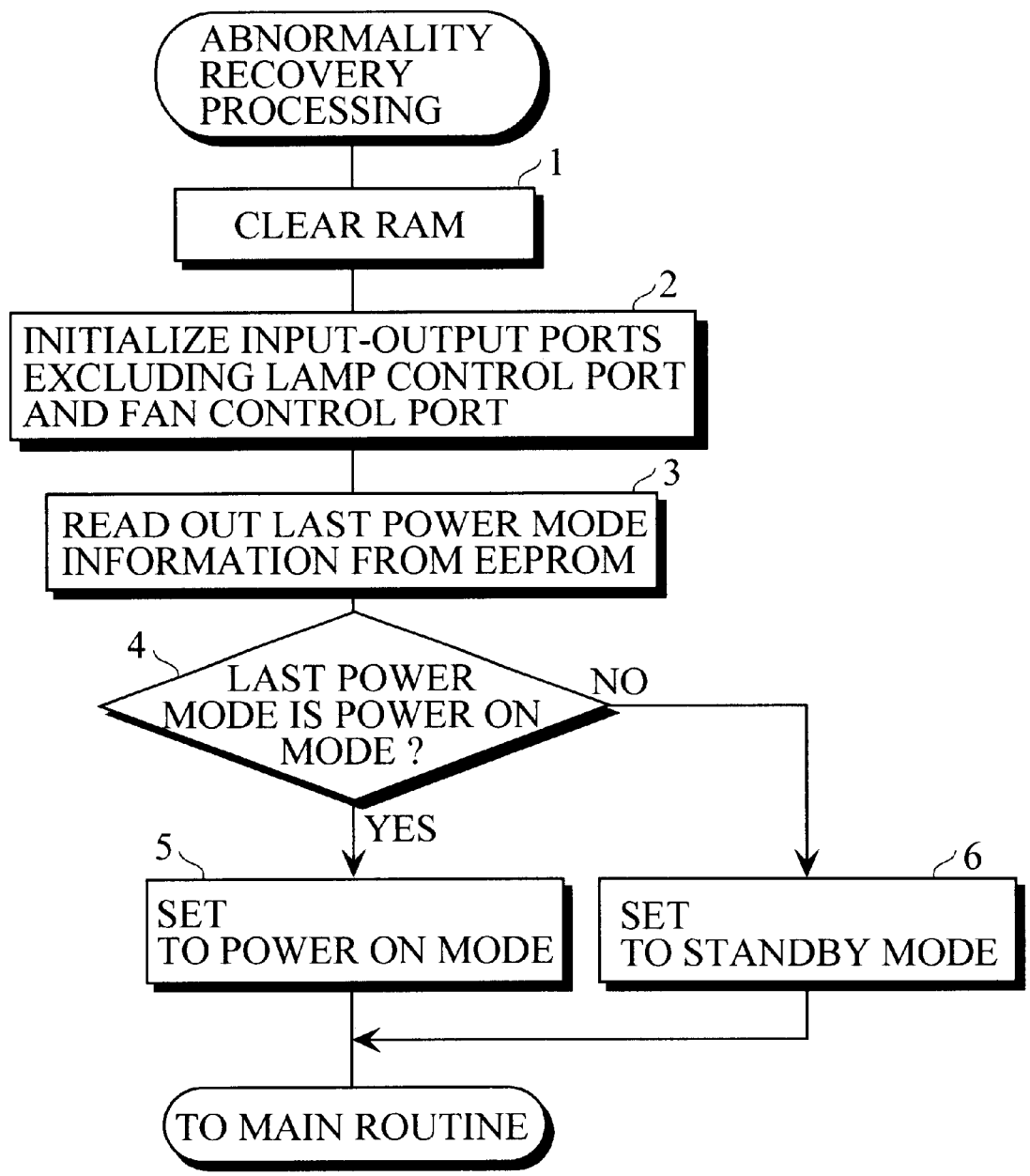
FIG. 2 is a flow chart showing the procedure for abnormality recovery processing.

FIG. 2 shows the procedure for abnormality recovery processing performed when the reset switch 2 is pressed.

The reset switch 2 is based on the premise that it is pressed when the liquid crystal projector circuit 8 is in the power on mode in some cases and is pressed when the liquid crystal projector circuit 8 is in the standby mode in the other cases.

In the abnormality recovery processing, a RAM (not shown) in the microcomputer 1 is first cleared (step 1). In this case, input-output ports, excluding a control port of the projecting lamp power supply circuit 3 and a control port of the fan power supply circuit 5, are initialized (step 2).

When the reset switch 2 is pressed in a case where the liquid crystal projector circuit 8 is in the power on mode, therefore, the microcomputer 1 can be initialized without turning the projecting lamp 4 off and stopping the fan 6. That is, the abnormal state of the microcomputer 1 can be recovered without turning the projecting lamp 4 off and stopping the fan 6. Further, the projector circuit power supply 7 is initialized to the off state, so that the power supply of the liquid crystal projector circuit 8 to the semiconductor is shut off. Accordingly, the abnormal state is solved.

When the reset switch 2 is pressed in a case where the liquid crystal projector circuit 8 is in the standby mode, it goes without saying that the projecting lamp 4 and the fan 6 are maintained in an off state.

Thereafter, the last power mode information is read out of the EEPROM 10 (step 3). A power mode (a power on mode or a standby mode) before pressing the reset switch 2 is judged on the basis of the read last power mode information (step 4).

When it is judged that the power mode before pressing the reset switch 2 is the power on mode, the liquid crystal projector circuit 8 is returned to the power on mode (step 5). The abnormal recovery processing is terminated.

When it is judged that the power mode before pressing the reset switch 2 is the standby mode, the liquid crystal projector circuit 8 is returned to the standby mode (step 6). The abnormal recovery processing is terminated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a liquid crystal projector using a microcomputer as a control unit of the liquid crystal projector and comprising a projecting lamp for projecting an image written into a liquid crystal cell and a cooling fan for the projecting lamp, the liquid crystal projector comprising:

a reset switch for resetting the operation of the microcomputer; and abnormality recovery means for initializing, when the liquid crystal projector is in a power on mode, other circuits and the microcomputer without stopping the projecting lamp and the cooling fan when the reset switch is turned on.

2. In a liquid crystal projector using a microcomputer as a control unit of the liquid crystal projector and comprising a projecting lamp for projecting an image written into a liquid crystal cell and a cooling fan for the projecting lamp, the liquid crystal projector comprising:

a reset switch for resetting the operation of the microcomputer; and an abnormality recovery circuit for initializing, when the liquid crystal projector is in a power on mode, other circuits and the microcomputer without stopping the projecting lamp and the cooling fan when the reset switch is turned on.

* * * * *